Patented Aug. 2, 1938

2,125,594

UNITED STATES PATENT OFFICE

2,125,594

FLOOR AND WALL COVERING MATERIAL

Hugo Strauch, Krefeld-Uerdingen, Germany, assignor to I. G. Farbenindustrie Aktiengesellschaft, Frankfort-on-the-Main, Germany No Drawing. Application December 19, 1935, Serial No. 55,293. In Germany December 29, 1934

16 Claims. (Cl. 106—7)

This invention relates to a new composition of matter and the manufacture of the same. The process of manufacture according to the invention is by working up a natural or artificial material having air-drying properties and being of a soft or liquid nature or a solution of a substance, which on drying by evaporation of the solvent yields a drying film, insoluble in water, or a mixture of both classes of materials, with a filler wetted with water, particularly with the addition of a wetting-out agent, to a mass which is preferably in the form of a friable powder.

The compositions obtainable in accordance with the invention are well adapted for the manufacture of floor and wall covering materials and for plastic masses and the like.

Among the products suitable as film forming viz. binding media in the process of this invention drying oils, such as linseed oil, tung oil, oiticica oil, sun flower oil, menhaden oil, perilla oil, poppy oil especially also in the form of heat treated oil (stand oil) may be mentioned. Furthermore oil lacquers can be employed, such as for example, those obtainable by dissolving in drying oils natural resins, such as rosin or copals and esters thereof, or also artificial resins, such as cumarone resins or the alkyd resins resulting from the condensation of polyhydric alcohols, polybasic acids and monobasic carboxylic acids derived from drying oils. In addition spirit lacquers can also find application, such as for example the lacquers obtainable by dissolving soft copal, sandarac, elemi or mastix in spirit and also solutions of cellulose esters, cellulose ethers, polymerized vinyl esters and vinyl ethers, polymerized acrylic and methacrylic esters, polymerized and subsequently chlorinated vinyl chloride, chlorinated rubber or other film forming materials in appropriate volatile organic solvents, such as methyl propionate, ethyl acetate, butyl acetate, glycol monoacetate, ethyl glycol acetate, ethyl glycol butylether, cyclohexanone, mixtures of the solvents mentioned before with aliphatic or aromatic hydrocarbons, such as benzine, ligroine, benzene, toluene, etc. Products of this kind which already inherently possess the requisite soft to liquid consistency such as for example stand oils and alkyd resins of soft consistency can be used as such wthout a solvent. Among the substances enumerated those possessing air-drying properties on account of their content of radicals of fatty acids derived from drying oils, particularly however, the air-drying alkyd resins are especially valuable for the purposes of the present invention.

The drying rate of the air-drying materials used in the performing of this invention can be increased by the addition of driers, such as for example the naphthenates, linoleates or resinates of lead, manganese or cobalt.

If solutions of cellulose derivatives or of certain polymerized vinyl compounds are used, the addition of softeners is recommended, such as for example, tricresylphosphate, dibutyl phthalate, adipic acid esters and phthalic acid esters.

As fillers to be used in the process of this invention any powdered or ground solids of inorganic or organic origin insoluble in water as well as in the binding medium and inert to the action of air, water and light at ordinary temperatures are operative. Particularly adapted for the purposes of this invention are stone meal, talcum, chalk, asbestos fibres, asbestos powder, leather dust, sawdust and cork meal. The fillers may be incorporated with pigments, such as ochre, yellow iron hydroxide, chromium hydroxide, titanium dioxide, zinc oxide and lithopone. The best results are obtained by mixing inorganic and organic fillers with one another.

It is especially advisable to apply the mineral filler in such a condition that coarser and finer particles are mixed with one another. The size of the particles may differ advantageously between about 1,5 and 420µ and the average particle size may come to 30–40µ.

The relative quantities of mineral and organic fillers can be varied. The higher the content of organic filler, such as for example sawdust, the better is the isolation power of the floor and wall coatings against heat and sound. It is to be recommended to use fillers consisting of about 15 to about 30 parts by weight of an organic filler besides 100 parts by weight of an inorganic filler.

According to the invention the filler or the fillers must be thoroughly moistened with water before adding the binding medium.

The quantity of water necessary for wetting the filler depends on the nature of the filler and has to be chosen in such a manner that neither a liquid mass nor a paste but a moistened friable powder is obtained. The quantity of water required depends to a high degree on the quantity of organic component contained in the filler; the more organic component being incorporated the more water is required. 100 parts by weight of the filler mentioned above consisting of about 15 to about 30 parts by weight of an organic filler besides 100 parts by weight of an inorganic filler require about 40–45 parts of water.

The moistened filler and the binding medium are to be mixed in such a way that a mass is obtained being neither liquid nor in form of a paste but having the consistency of a friable powder similar to wet earth. The best proportion is to combine 100 parts by weight of the water-moistened filler with about 12 to about 18 parts by weight of the binding medium including the volatile solvent employed.

In the majority of cases the addition of a wetting agent, such as for example a sodium or ammonium salt of an alkylated naphthalene sulfonic acid or sulfonated castor oil or sulfuric acid esters of alcohols containing more than 8 carbon atoms to the water employed for wetting the filler is recommended. Particularly good results are obtained when a wetting agent is employed, which is soluble both in water and also in organic media, particularly in drying oils. As such may be mentioned triethanolamine or a product obtainable by the action of ethylene oxide on hydroxyl derivatives of compounds possessing long aliphatic chains, for example octadecyl alcohol or castor oil.

The working up of the moistened filler with a soft to liquid binding medium is accomplished in any known manner, for example in a mixing drum fitted with stirring devices. It is particularly noteworthy that the proportion of the components of the artificial material should be so selected that a friable earth-like non-tacky product results.

The process consisting in wetting the filler with water before the addition of the binding medium has the special advantage that masses produced in this manner can more easily be spread out in a uniform thick layer on the surface with the usual instruments, furthermore the drying takes place much quicker than that of masses, the filler of which is not moistened with water. The difference is so important that the masses produced with fillers not moistened with water are not adapted at all for the manufacture of floor and wall coverings.

The working up of such a product, for example to a floor covering is carried out by spreading the mass in a uniform layer on the surface of the floor, advantageously after the floor has been given a preliminary coating with a varnish or lacquer. The powder is then pressed on to the surface by means of a suitable instrument, such as for example, a roller or a trowel. Depending on the nature of the starting material the covering obtained can be walked upon and will hold nails after some 3 to 5 days.

The invention is illustrated by the following examples, but not restricted thereto; the parts are by weight:

Example 1.—150 parts by weight of wood meal, 50 parts by weight of chalk, 100 parts by weight of talcum and 650 parts by weight of stone meal, together with 20 parts by weight of chromium oxide are wetted for 1½ hours in a suitable mixing apparatus with a solution containing in 100 parts of water, 4 parts by weight of a wetting agent obtainable by the action of ethylene oxide on castor oil and soluble as well in water as in oils. Into this mixture is caused to flow with constant stirring a solution of 70 parts by weight of an alkyd resin obtainable by the condensation of 270 parts by weight of linseed oil fatty acid, 92 parts by weight of glycerine and 130 parts by weight of phthalic anhydride in 30 parts by weight of linseed oil, to which are added 3.5 parts by weight of the above mentioned wetting agent, 4 parts by weight of lead manganese drier and 15 parts by weight of solvent naphtha. The mass is then thoroughly intermixed for about another hour. In this manner a friable powder of moist appearance is obtained.

The working up of this powder to a floor covering is effected in the following manner:

The floor, for example a concrete floor, is coated with a solution of 70 parts by weight of cumarone resin and 10 parts by weight of linseed oil in 20–30 parts by weight of solvent naphtha. The coating having dried the powder is applied in a uniform layer of 3 to 4.5 mms. thickness and thoroughly rolled down by means of a roller. After some 2–3 days the covering can be walked upon.

Example 2.—Instead of 70 parts by weight of the alkyd resin of Example 1, a mixture of 35 parts by weight of the same alkyd resin and 35 parts by weight of cumarone resin may be employed. The alkyd resin may also be replaced completely by the same weight of soft cumarone resin.

Example 3.—A mixture of 30 parts by weight of stand oil and 70 parts by weight of linseed oil, to which 4 parts by weight of a lead manganese naphthenate drier and 10 parts by weight of solvent naphtha are added, is caused to flow into the filler mixture wetted as described in Example 1. The further working up of the product is carried out as described in Example 1.

Example 4.—100 parts by weight of cumarone resin or of the condensation product employed in Example 1 obtained from linseed oil fatty acid, glycerine and phthalic anhydride are added to 25–40 parts by weight of solvent naphtha or white spirit and 3–4 parts by weight of lead manganese drier. This solution is thoroughly intermixed with 440 parts by weight of stone meal, 50 parts by weight of a mixture of pigments, consisting of about 40 parts by weight of chromium oxide green with about 10 parts by weight of zinc oxide white, and 100 parts by weight of wood meal moistened with a solution of 10 parts by weight of a wetting agent obtainable by the action of ethylene oxide on castor oil in 180 parts of water. After good working up in a mixing apparatus a friable mass able to be spread out in a uniform thick layer is obtained.

I claim:

1. A composition of matter comprising a filler and a pigment moistened with an aqueous solution of a product obtainable by the action of ethylene oxide on castor oil thoroughly intermixed with material selected from the group consisting of a drying oil, stand oil, an alkyd resin of soft consistency comprising a radicle of a fatty acid derived from a drying oil and a lacquer, said material being incorporated with a drier.

2. A composition of matter comprising a mixture of an organic and an inorganic filler incorporated with a pigment and moistened with an aqueous solution of a product obtainable by the action of ethylene oxide on castor oil thoroughly intermixed with material selected from the group consisting of a drying oil, stand oil, an alkyd resin of soft consistency comprising a radicle of a fatty acid derived from a drying oil and a lacquer, said material being incorporated with a drier.

3. A composition of matter comprising a mixture of an organic and an inorganic filler incorporated with a pigment and moistened with an aqueous solution of a product obtainable by the action of ethylene oxide on castor oil thoroughly intermixed with a solution of a condensation product comprising the radicles of linseed oil fatty acid, glycerine and phthalic anhydride in linseed oil and a drier.

4. A composition of matter comprising a mixture of wood meal, stone meal, talcum and a pigment and moistened with an aqueous solution of a product obtainable by the action of ethylene oxide on castor oil thoroughly intermixed with a solution of a condensation product comprising the radicles of linseed oil fatty acid, glycerine and phthalic anhydride in linseed oil and a drier.

5. A composition of matter comprising a mixture of wood meal, chalk, talcum, stone meal and chromium oxide moistened with an aqueous solution of a product obtainable by the action of ethylene oxide on castor oil thoroughly intermixed with a solution of a condensation product comprising the radicles of linseed oil fatty acid, glycerine and phthalic anhydride in linseed oil added with a reaction product of ethylene oxide and castor oil, a lead manganese drier and solvent naphtha.

6. A composition of matter comprising a mixture of wood meal, chalk, talcum, stone meal, chromium oxide moistened with an aqueous solution of a product obtainable by the action of ethylene oxide on castor oil thoroughly intermixed with a mixture of stand oil and linseed oil added with a lead manganese drier and solvent naphtha.

7. A composition of matter comprising a mixture of stone meal, chromium oxide green, zinc oxide and wood meal moistened with an aqueous solution of a product obtainable by the action of ethylene oxide on castor oil thoroughly intermixed with a solution of a condensation product comprising the radicles of linseed oil fatty acid, glycerine and phthalic anhydride in white spirit and a drier.

8. In a process for the manufacture of floor and wall covering material the step which comprises thoroughly intermixing a mixture of wood meal, chalk, talcum, stone meal and chromium oxide moistened with an aqueous solution of a product obtainable by the action of ethylene oxide and castor oil with a solution of a condensation product comprising the radicles of linseed oil fatty acid, glycerine and phthalic anhydride in linseed oil added with the reaction product of ethylene oxide on castor oil, a lead manganese drier and solvent naphtha.

9. In a process for the manufacture of floor and wall covering material the step which comprises thoroughly intermixing a mixture of wood meal, chalk, talcum, stone meal, chromium oxide moistened with an aqueous solution of a product obtainable by the action of ethylene oxide on castor oil with a mixture of stand oil and linseed oil added with the lead manganese drier and solvent naphtha.

10. In a process for the manufacture of floor and wall covering material the step which comprises thoroughly intermixing a mixture of stone meal, chromium oxide green, zinc oxide and wood meal moistened with an aqueous solution of a product obtainable by the action of ethylene oxide on castor oil with a solution of a condensation product comprising the radicles of linseed oil fatty acid, glycerine and phthalic anhydride in white spirit and a drier.

11. A composition of matter comprising in thorough admixture a filler consisting of ground organic and inorganic material, a material selected from the group consisting of a drying oil, stand oil, an alkyd resin of soft consistency comprising a radicle of a fatty acid from a drying oil and an oil lacquer and a quantity of an aqueous solution of a wetting out agent sufficient to impart to the composition the property of readily forming friable lumps, said material being incorporated with a drier.

12. A composition of matter comprising in thorough admixture a filler consisting of ground organic and inorganic material, a material selected from the group consisting of a drying oil, stand oil, an alkyd resin of soft consistency comprising a radicle of a fatty acid from a drying oil and an oil lacquer and a quantity of an aqueous solution of a wetting out agent soluble both in water and in organic media sufficient to impart to the composition the property of readily forming friable lumps, said material being incorporated with a drier.

13. A composition of matter comprising in thorough admixture a filler consisting of ground organic and inorganic material, a material selected from the group consisting of a drying oil, stand oil, an alkyd resin of soft consistency comprising a radicle of a fatty acid from a drying oil and an oil lacquer and a quantity of an aqueous solution of a wetting out agent soluble both in water and drying oils sufficient to impart to the composition the property of readily forming friable lumps, said material being incorporated with a drier.

14. A composition of matter comprising in thorough admixture a filler consisting of ground organic and inorganic material, a pigment, a material selected from the group consisting of a drying oil, stand oil, an alkyd resin of soft consistency comprising a radicle of a fatty acid from a drying oil and an oil lacquer and a quantity of an aqueous solution of a wetting out agent soluble both in water and in drying oils sufficient to impart to the composition the property of readily forming friable lumps, said material being incorporated with a drier.

15. In a process for the manufacture of floor and wall covering material the step which comprises thoroughly intermixing a filler with a quantity of an aqueous solution of a wetting out agent sufficient to impart to the composition the property of readily forming friable lumps and material selected from the group consisting of a drying oil, stand oil and an alkyd resin of soft consistency comprising a radicle of a fatty acid from a drying oil and an oil lacquer, said material being incorporated with a drier.

16. In a process for the manufacture of floor and wall covering material the step which comprises thoroughly intermixing a filler with a quantity of an aqueous solution of a wetting out agent soluble both in water and in organic media sufficient to impart to the composition the property of readily forming friable lumps and material selected from the group consisting of a drying oil, stand oil, an alkyd resin of soft consistency comprising a radicle of a fatty acid from a drying oil and an oil lacquer, said material being incorporated with a drier.

HUGO STRAUCH.